United States Patent Office 3,808,312
Patented Apr. 30, 1974

3,808,312
LONG LASTING EUPHORIANT RESIN FOR CATS
Robert Lee Goulding, Jr., and Akos Dominic St. Clair, Corvallis, Oreg., assignors to A. H. Robins Company Incorporated, Richmond, Va.
No Drawing. Continuation-in-part of application Ser. No. 162,683, July 14, 1971, which is a continuation-in-part of application Ser. No. 123,803, Mar. 12, 1971, both now abandoned. This application Feb. 12, 1973, Ser. No. 331,447
Int. Cl. A01n 17/14; A61k 9/00, 27/00
U.S. Cl. 424—78                                         1 Claim

ABSTRACT OF THE DISCLOSURE

Euphoriant resin attractants for cats having homogenous dispersions of liquid euphoriant extracts, vapors of which release slowly, are disclosed and methods for preparing and using same are described.

---

This invention relates to novel resin compositions, more particularly it relates to novel resin compositions having a dispersion of liquid euphoriant extract for cats within said resin and to methods for preparing and using the same.

The present application is a continuation-in-part of copending application Ser. No. 162,683 filed July 14, 1971, which is a continuation-in-part application Ser. No. 123,803 filed Mar. 12, 1971, both now abandoned.

The catnip plant has long been known for its ability to create a feeling of well being in cats which are in close proximity to it due to the odors and vapors. Leaves and stems have heretofore been packaged or covered and bound together in various ways and with various materials and used as toys for cats. Because of large surfaces of the leaves, the materials in the plant leaves responsible for the odors have tended to evaporate rather quickly and, therefore, the toys have lost their effectiveness in a relatively short time. The bulkiness of the leaves and stems is a limitation on the amount which can be physically incorporated. The bulkiness and porosity of stems and leaves both act to reduce the longevity of the toys. Such catnip toys are vulnerable to clawing and biting action of acts.

It is, accordingly, an object of this invention to provide a composition of matter suitable as an euphoriant attractant comprising a liquid euphoriant extract and a solid organic thermoplastic resin. A further object is to provide nearly transparent euphoriant resin compositions of matter. A still further object is to provide tough euphoriant resin compositions of matter which will withstand the vigorous clawing and biting assault of playful cats. Other objects will become apparent to one skilled in the art and still others will become apparent hereinafter.

The catnip plant (*Nepata cataria*) and the silver vine plant (*Actinidia polygama*) are examples of plants from which natural essential oils may be obtained and incorporated in our resins to produce euphoria in cats, said essential oils being herein known as euphoriant extracts for cats. Euphoriant extracts for cats are further defined as that physiologically active portion of liquid obtained from said plants responsible for the euphoric response, be it obtained by extraction, distillation, squeezing or by any suitable method for obtaining said euphoriant extract. Synthetic oil of nepetalactone was found to be totally inoperative in our invention and it is necessary to incorporate the extract in its entirety. Measurement of euphoriant extract strengths and concentrations herein disclosed are based upon the quality of said contained physiologically active components potentially capable of volatilizing to produce euphoria in cats. However, it is not until the euphoriant extract is incorporated into the resin by dispersion in the proper dilution that the whole resin becomes an attractant and an euphoriant for cats. The concentration of the euphoriant extract in the resin was found to be critical to the performance of the resin as an euphoriant for cats both initially and long term. Whereas full strength euphoriant extracts of any significant quantity in close proximity to cats act as a repellant rather than an attractant, a resin containing no more than about 0.5 weight percent euphoriant extract dispersion serves as a diluent and is in effect a reservoir of vapor releasing oil. Resins containing more than about 0.5 weight percent concentration of euphoriant extract become a repellant to cats and unsuitable. In effect, the resin becomes a uniform replacement for the natural product, furnishing the rather critical ratio of euphoriant vapor over a relatively long period of time. Preferred formulations of our resins containing liquid euphoriant dispersions remain effective for several months' exposure to the atmosphere. When kept in sealed containers wherein the enclosure becomes saturated with euphoriant vapor, the resins may be stored for indefinite periods of time without appreciable decrease in euphoriant content. Below about 0.05 weight percent euphoriant extract concentration in the resin the euphoriant is only midly effective. Concentration was therefore found to be of critical importance and in view of the foregoing, our preferred resins contain 0.05 to 0.5 weight percent euphoriant extract.

Preferably the resin is fashioned into the shape of a toy; however, attractant quality does not depend upon any particular design and, consequently, an object of any shape or form which is sturdy enough for playful action of cats would have and retain basically the same desired properties of sustained long-term vapor release. Items contributing to euphoric reactions in cats, made of said resin materials, may be fashioned in such shapes as flat plates, strips, bars, balls, rods, etc., and even in the shape of the plant stems and leaves from which the euphoriant was extracted. Shaping may be done by fusing and curing the resin in a mold and cooling, or it may be done when feasible by cutting from larger blocks of the solidified thermoplastic resin. The items may be hollow. The items disclosed above may also be extruded. Dyes may be used in the formulation if desired.

The objects of this invention are accomplished by mixing 0.05 to 0.5 weight percent of euphoriant extract with a suitable thermoplastic resin mixture and heating to fuse the resin below 500° F., said resin having been plasticized to a suitable toughness for cats on hardening at normal temperatures. Suitable stabilizers are added. Resins suitable for carrying out the invention are vinyl resins such as the polyvinyl halides, polyvinyl acetates and polyvinylidene halide resins. Because of the general affinity of euphoriant extracts for an compatibility with polyvinyl chloride plasticized resin, polyvinyl chloride is the preferred basic starting material. Polyvinyl chloride resins, when prepared in our preferred manner, are ideally suited to sustained slow release of euphoriant vapor over a long period of time due to the permeability characteristic of the resulting euphoriant resin and are resistant to the chewing action of cats.

We have found that an ether (diethyl ether) extract of the catnip plant (*Nepeta cataria*) concentrated on a rotary evaporator to the catnip oil and a commercial natural oil of catnip extract are suitable for incorporation into our novel resin combination, the ether extracted and concentrated crude oil being preferred. The ether extracted and concentrated oil of the catnip-like silver vine plant (*Actinidia polygama*) is also suitably dispersed in our resin combination to provide a slow release euphoriant resin for cats. A commercially available imitation oil of catnip in our resin did not produce significant physiological response in cats.

A suitable general process for preparing the resin having a homogeneous dispersion of euphoriant extract incorporated within the resin is to thoroughly mix by stirring the resin ingredients (dispersion resins and extender resins) and 0.05 to 0.5 weight percent euphoriant extract and to heat to the fusion point. In our preferred polyvinyl chloride based resin, appropriate amounts of polyvinyl chloride resins, a plasticizer which is di-2-ethylhexylphthalate (DOP, dioctylphthalate), octyl tallate, a stabilizer as, for example, BC–109™ (liquid Ba-Cd-Zn stabilizer commercially available from Cincinnati Milacron Chemicals, Inc., Modern Plastics Encyclopedia, vol. 49, No. 10A, October 1972, McGraw-Hill Publishing Company, page 476) and the euphoriant extract are mixed and heated to a fusion temperature of 300–400° F. in a mold for several minutes until solidified. The toughness in the polyvinyl chloride resin is controlled by use of the DOP. Preferred amounts of DOP are 25–35 weight percent of the final resin.

Nepetalactone, the volative active component of the euphoriant extract, together with its natural adjuncts, when derived by extracting the catnip plant is responsible for the physiological activity in cats in this instance and is sensitive to decomposition by basic and acidic ions in the presence of heat and is converted to the physiologically inactive non-volatile odorless nepetalic acid under certain conditions. Surprisingly, the components of our preferred resin, including the basic barium, cadmium and zinc compounds, and conditions of processing at temperatures up to 400° F. have no deleterious effect on the active nepetalactone.

The following examples are intended to illustrate the nature and composition of this invention without unduly restricting it.

EXAMPLE 1

A mixture in percentages by weight of:

|  | Percent |
|---|---|
| PVC homopolymer (dispersion resin)<sup>a</sup> | 46 |
| PVC homopolymer (extender resin)<sup>b</sup> | 19.7 |
| DOP (di-2-ethylhexyl phthalate) | 29.5 |
| OTE (octyl, tallate, epoxidized)<sup>c</sup> | 3.3 |
| BC–109™ (liquid Ba-Cd-Zn stabilizer)<sup>d</sup> | 1.3 |
| Natural essential oil of catnip <sup>e</sup> | 0.2 |

[a] Diamond PVC–7502™ commercially available from Diamond Shamrock Chemical Company. High molecular weight homopolymer dispersion resin; particle size less than two microns; specific viscosity 1.62 to 1.68 as measured in a 1% solution of the resin in cyclohexanone at 30° C. according to ASTM procedure.
[b] Diamond PVC 7–44L™ commercially available from Diamond Shamrock Chemical Company. Intermediate molecular weight homopolymer extender resin; particle size 95% through 140 mesh with a specific viscosity of 1.15 as measured in a 1% solution of the resin in cyclohexane at 30° C. according to ASTM procedure.
[c] Molecular weight 420, sp. gr. at 25° C.=0.919, refr. index at 25° C. 1.457, freezing point 230° C.
[d] Produced by Cincinnati Milacron Chemicals, Inc. A proprietary mixture of organic barium and cadmium and zinc salts in liquid form and commercially available stabilizer of PVC resins.
[e] Obtained from Fritzsche, Dodge and Olcott.

was thoroughly pulverized into fine particles, fused and cured at 300–400° F. over an eight minute period in an aluminum toy mold 3/16" in depth. After air cooling, the solid organic thermoplastic resin was removed from the mold.

EXAMPLE 2

Following the procedure of Example 1 and using the same proportions of basic resin ingredients, polyvinyl chloride resins containing 0.01, 0.15, 0.12, 0.25, 0.5 and 1.0 weight percent natural essential oil of catnip extract were prepared. The euphoriant extract content as defined hereinabove is 0.01 to 1.0 weight percent.

EXAMPLE 3

Fresh catnip leaves were finely chopped and extracted with ether for two hours in a Soxhlet extractor. The extract was concentrated by removal of the ether solvent on a rotary vacuum evaporator. Following the procedure of Example 1 and using the same proportion of resin ingredients, polyvinyl chloride resins were prepared wherein the crude extract varied from about 1 to 3 weight percent and the euphoriant extract content as defined hereinabove was 0.1 to 0.3 weight percent.

EXAMPLE 4

Following the procedure of Example 1 and using the same proportions of resin components except for the catnip oil, a polyvinyl chloride resin containing 0.25 weight percent imitation catnip oil was prepared.

EXAMPLE 5

Following the procedure of Example 1 and using the same proportions of ingredients, the oil of catnip was stirred into the resin after it had partially fused and the resulting resin placed in a thin flat mold. After cooling, the polyvinyl chloride resin was removed from the mold.

EXAMPLE 6

Fresh leaves of the silver vine plant (*Actinidia polygama*) were finely chopped and extracted with ether for two hours in a Soxhlet extractor. The extract is concentrated by removal of the ether solvent on a rotary vacuum evaporator. Following the procedure of Example 1 and using the same proportion of resin ingredients, polyvinyl chloride resins were prepared with crude extract herein described, said resins containing about 0.05, 0.1, 0.2 and 0.3 weight percent essential oil of *Actinidia polygama*. The concentration range of euphoriant extract as defined hereinabove is 0.05 to 0.3 weight percent.

All resins prepared in Examples 1 to 6 were resistant to playful clawing and chewing action of cats.

The following testing procedure of determining euphoriant action was used.

Testing procedure

One cat at a time is placed on an observation table and the resin strips of varying euphoriant composition are offered approaching from the rear moving the test strip about the cheek, nasal and mouth areas in close proximity to the fur. Resin strips are 1.5" x 3/8" x 1/8" and to which a hemostat clamp is fastened on one end and held in the hand. The response is classified as follows:

0=no response
±=minimal response, prodding is required to maintain even slight interest.
+=fairly sustained interest but response is submaximal.
++=classical euphoric response to catnip plant.

To assist in classifying the ± (minimal) and + (submaximal) response, a strip of resin containing no euphoriant extract is used as a placebo. Tests are repeated periodically to determine the length of time vapors emanating from the resin combination remain effective. Test strips are left exposed to the atmosphere at room temperature between testing sessions.

Results of the testing of some of the materials in Table I show that the resin formulation containing the ether extracted crude oil of catnip was slightly superior to the natural commercial oil and was still highly effective after ten months. The response to the resin containing the synthetic oil was essentially nil; consequently, the testing of this resin strip was discontinued after five weeks.

Euphoriant resins containing dispersions of essential oil of *Actinidia polygama* extract (0.05 to 0.5 weight percent, (Example 6) were tested in the same manner as described in the foregoing and response obtained was approximately the same as with about the same concentration of crude catnip oil obtained by ether extraction of catnip leaves.

Resins were prepared containing more than 0.5 weight percent euphoriant extract and cats were repulsed by the resin so prepared. In testing of resins containing exactly 0.5 weight percent euphoriant extract, slight repulsion was noted in reactions of some cats intially. However, with pasage of time and exposure to the atmosphere these resins initially containing 0.5 weight percent euphoriant extract became acceptable euphoriants for cats.

What is claimed is:

1. A composition having euphoriant attractant action on cats consisting of cured polyvinyl chloride plasticized resin having a dispersion of euphoriant extract for cats within said resin in the form of an oil in the amount of 0.05 to 0.50 weight percent, said euphoriant extract being selected from the essential oils of the catnip plant and the silver vine plant.

TABLE I.—RESPONSE OF CATS TO VINYL CHLORIDE RESINS CONTAINING DISPERSIONS OF VARIOUS CATNIP OIL EXTRACTS [a]

| | | Number of cats responding to the degree indicated | | | | | | |
|---|---|---|---|---|---|---|---|---|
| | Degree of response | Resin-A [a,b] (0.25% imitation catnip oil) | Resin-B [a,c] (0.1 to 0.3% ether extracted catnip oil) | Resin-C [a,d] (0.12% essential oil of catnip) | Resin-D [a,e] (0.25% essential oil of catnip) | Resin-E [f] (0.2% essential oil of catnip) | Resin-F (0.01% essential oil of catnip) | Resin-G (0.05% essential oil of catnip) |
| Days after exposing sample to atmosphere: | | | | | | | | |
| 1 | 0 | 5 | 3 | 2 | 6 | | 1 | 1 |
| | ± | | | | | | 1 | |
| | + | | 8 | 1 | 1 | | 2 | 2 |
| | ++ | | | | | | 1 | 2 |
| 5 | 0 | 7 | 4 | 5 | 5 | 1 | | |
| | ± | 1 | | | | | | |
| | + | 1 | 2 | 3 | 1 | 2 | | |
| | ++ | | 1 | | | 2 | | |
| 13 | 0 | 5 | | 4 | 4 | | | |
| | ± | | | | | | | |
| | + | 1 | 5 | 2 | 2 | | | |
| | ++ | | | | | | | |
| 34 | 0 | 5 | 2 | 4 | 3 | | | |
| | ± | | | | 1 | | | |
| | + | 1 | | 1 | 1 | | | |
| | ++ | | 4 | 1 | 1 | | | |
| 30 | 0 | 5 | 2 | 4 | 4 | | | |
| | ± | | | | | 2 | | |
| | + | | 1 | | | 1 | | |
| | ++ | | 2 | 1 | 1 | | | |
| 54 | 0 | (h) | | 2 | 3 | | 2 | |
| | ± | | | | | | 2 | 2 |
| | + | | 1 | 1 | | | 1 | 2 |
| | ++ | | 4 | 2 | 2 | | | 1 |
| 77 | 0 | | | 2 | 1 | | | |
| | ± | | | | | | | |
| | + | | 1 | | 1 | | | |
| | ++ | | 4 | 3 | 3 | | | |
| 92 | 0 | | | 1 | 1 | | | |
| | ± | | | 1 | 1 | | | |
| | + | | 2 | 1 | 1 | | | |
| | ++ | | 1 | | | | | |
| 300 | 0 | | | 1 | 1 | 1 | | |
| | ± | | | 1 | 2 | | | |
| | + | | 2 | 1 | 1 | 3 | | |
| | ++ | | 3 | 2 | 1 | 1 | | |
| Mean attractiveness score: [g] | | | | | | | | |
| 3 mo | | [i] 0.23 | 1.9 | 1.0 | 0.86 | | | |
| 10 mo | | | 2.6 | 1.8 | 1.4 | 1.8 | | |

[a] Strips of resin 1½" x ⅜" x ⅛".
[b] Vinyl chloride resin containing 0.25 weight percent imitation catnip oil (Example 4) (Gentry Corp.).
[c] Vinyl chloridd resin containing 0.1 to 0.3 weight percent ether extracted essential oil of catnip (Example 3; catnip leaves extracted with ether and evaporated).
[d] Vinyl chloride resin containing 0.12 weight percent essential oil of catnip (Fritzsche, Dodge and Olcott; Example 2).
[e] Vinyl chloride resin containing 0.25 weight percent essential oil of catnip (Fritzsche, Dodge and Olcott; Example 2).
[f] Vinyl chloride resin molded in the shape of a flat bird-like cat toy containing 0.2 weight percent essential oil of catnip (Fritzsche, Dodge and Olcott; Example 1).
[g] Mean attractiveness scores obtained by weighing individual responses (++=3; +=2; ±=1; and 0=0) and dividing sum by total number of observations.
[h] Testing discontinued.
[i] 54 days.

References Cited

UNITED STATES PATENTS

| 1,149,170 | 8/1915 | Allis | 119—29.5 |
| 3,104,648 | 9/1963 | Fisher | 119—29.5 |
| 1,265,926 | 5/1918 | Ludham | 119—29.5 |

FOREIGN PATENTS

| 599,237 | 3/1948 | Great Britain | 424—78 |
| 660,407 | 11/1951 | Great Britain | 424—78 |
| 1,194,996 | 6/1970 | Great Britain | 424—78 |

SAM ROSEN, Primary Examiner

U.S. Cl. X.R.
424—84